United States Patent

[11] 3,570,415

| [72] | Inventors | Robert H. Drinnon<br>Kent, Wash.;<br>Leo Huttas, North Massapequa, N.Y. |
|---|---|---|
| [21] | Appl. No. | 783,602 |
| [22] | Filed | Dec. 13, 1968 |
| [45] | Patented | Mar. 16, 1971 |
| [73] | Assignee | The Boeing Company<br>Seattle, Wash. |

[54] TRACK SUPPORTED MOUNTING DEVICE FOR AIRCRAFT
2 Claims, 5 Drawing Figs.

[52] U.S. Cl................................................ 105/369,
248/361, 244/118
[51] Int. Cl................................................ B61d 45/00,
B60p, 7/08
[50] Field of Search............................................ 105/368
(T), 369 (A); 248/361, 361 (A); 280/179, 179.1;
104/258, 259; 244/118, 137

[56] References Cited
UNITED STATES PATENTS

| 2,422,693 | 6/1947 | McArthur | 105/369(A) |
| 2,605,064 | 7/1952 | Davis | 105/369(A) |
| 2,625,118 | 1/1953 | Lechner | 105/369(A) |
| 2,735,377 | 2/1956 | Elsner | 105/369(A) |
| 3,187,686 | 6/1965 | DePodesta | 105/369(A) |
| 3,300,171 | 1/1967 | Watts | 105/369(A) |
| 3,306,234 | 2/1967 | Hansen et al. | 105/369(A) |
| 3,478,995 | 11/1969 | Lautzenhiser et al. | 248/361 |

*Primary Examiner*—Drayton E. Hoffman
*Attorneys*—Glenn Orlob and Nicolaas De Vogel ABSTRACT: A device for mounting payload units on a rail in airplanes. The base structure has an integral caliper-type configuration for slidable engagement about the head portion of a rail structure. A spring mounted plunger and associated actuating means, such as an eccentric, are carried by the device and upon actuation of the eccentric, the plunger will extend into a rail cutout or detent for securing the caliper engagement and thus locking the device to the rail. Upon further actuation of the eccentric the plunger will contract and unlock the device.

INVENTORS:
ROBERT H. DRINNON
LEO HUTTAS
BY

AGENT

3,570,415

TRACK SUPPORTED MOUNTING DEVICE FOR AIRCRAFT

BACKGROUND OF THE INVENTION

1. Field of the Invention

This invention relates generally to mounting or securing devices and more particularly to a quick release payload hold-down device for aircraft. The device includes a unique integral base structure and plunger member, which is readily movable to secure the device upon actuation of an eccentric means which simultaneously prevents inadvertent release of the mounting device from a supporting rail structure.

2. Description of the Prior Art

Various mounting devices are used on aircraft for securing payload units, such as cargo or seating units. These devices are held in tracks or rails which run the length of an airplane fuselage to enable the devices to be slid along the fuselage until they are in the best position for attaching cargo straps or mounting seating units. The devices are held to the floor by any protuberant part, such as a boss or a stud, which fit within the track. However, the fittings must also securely be fastened along the track to prevent sliding. The conventional tracks used in aircraft, have a U-shaped cross section with inward protruding flanges at the upper end portions. The flanges are provided with notches at spaced intervals so that the mounting devices can be fitted to the track and slidably engaged.

For example, the above described conventional mounting devices and associated tracks are shown in the patents to WATTS (U.S. Pat. No. 3,300,171), BURNS et al. (U.S. Pat. No. 3,189,313), HIGUCHI (U.S. Pat. No. 3,263,629), and BASS et al. (U.S. Pat. No. 3,344,749).

Hence, it can be seen that the construction of the above-mentioned patent devices is somewhat complicated, sturdy but heavy, and the conventional rail or airplane seat track adds to the overall weight of the payload tiedown system.

As is well known, weight reduction in airplanes is one of the most important and continuous efforts in aircraft engineering design. Therefore, an item which is designed lighter in weight, but does not impair the safety or efficiency of the designed item, is a very important and advantageous step in the aircraft building industry.

Obviously, less weight is of importance to aircraft, and in particular where the large aircraft of the future are concerned, such as the 747, C5A and SST.

An inverted T-shaped rail or track extrusion with a suitable uncomplicated reliable mounting device as disclosed in the present invention has proven to provide a considerable weight reduction compared to conventional mounting devices and tracks, without impairing the engineering and Federal Aviation Agency (FAA) requirements.

A typical rail structure somewhat similar for use with the present invention is shown in a patent to ELSNER (U.S. Pat. No. 2,735,377). However, the mounting device is entirely different from that of the present disclosure.

SUMMARY OF THE INVENTION

The present invention is an adjustable mounting device provided with a quick release and securing means which together with its associated supporting rail structure offers a new, high-performance payload securing system for aircraft. Besides the features of quick release, reliability, safety and close interval adjustability, this efficient system is less heavy than existing systems.

It is accordingly an object of the present invention to provide a tiedown or mounting device for aircraft which offers (in addition to all the features of quick release, reliability, safety and close interval adjustability available in conventional mounting devices) a comparable weight reduction.

It is another object of the present invention to provide a mounting device for aircraft which in combination with its seat rail structure offers a dependable interlocking mounting feature assuring an economic improvement for aircraft.

It is a further object of the present invention to provide a mounting device which is safe because the quick release and securing feature incorporates a resilient means that prevents inadvertent disconnection.

In general, the invention discloses a device for mounting an object to a supporting rail structure and comprises a body having a jaw shaped base structure for complementary engagement with a supporting rail structure, and a plug, which is movably supported by the body and actuated by an actuating member which is disposed on the body for positioning the plug, so that the engagement becomes secured. In order to assist in the positioning of the plug and also to prevent inadvertent release, the plug is resiliently mounted by a compressed spring which forces the plug within the rail cutout section.

The actuating means comprises an eccentric cam type actuating member that is operably positioned on the device in substantial perpendicular relationship to the plunger.

Besides the objects mentioned above, this invention provides many other objects, advantages and features which will become fully apparent from the following detailed description taken in conjunction with the accompanying drawings which illustrate and clarify the preferred embodiment of the disclosed device.

DESCRIPTION OF THE PREFERRED EMBODIMENTS

Figure 1:
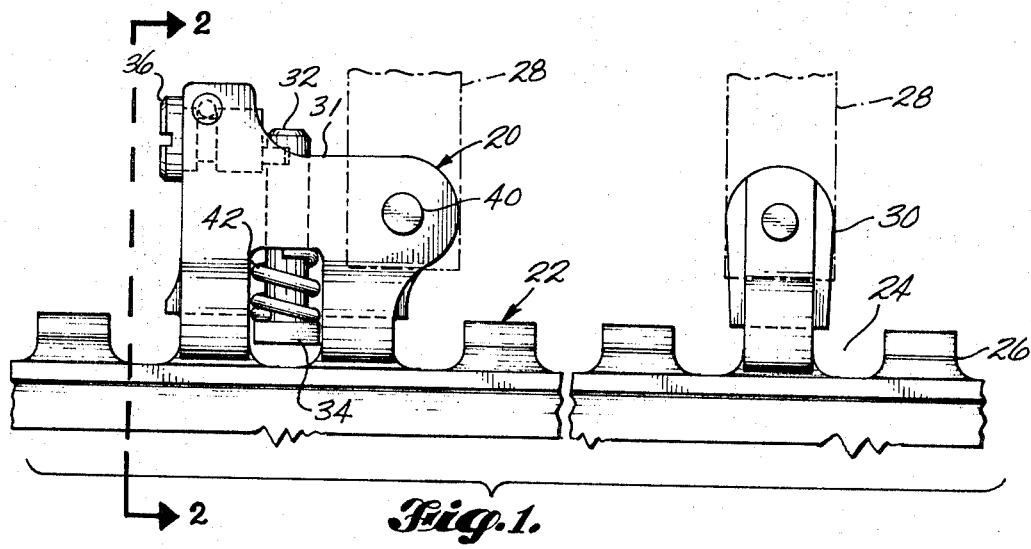
FIG. 1 is a side view of the first preferred embodiment of the mounting device and a typical fitting, which is used in conjunction with the mounting positioning device, for securing seating units to a track.

With reference now to the drawings, there is shown in FIG. 1 a mounting device 20 which is secured on a rail 22. The rail 22 is part of a so-called seat track which is mounted to the floor of the aircraft and in general extends parallel to the length of the airplane fuselage. The rail 22 is provided with regularly spaced cutout sections 24 in the top rail portion or head portion 26 in order to permit the installation of the mounting devices 20 at various spaced locations for attaching payloads to the airplane floor. Especially where seating units 28 are concerned, the ability to arrange the seating units 28 at certain spaced intervals and locations is required, as well as the positioning and fastening of the cargo in particular locations on the floor. A conventional screw type fitting component, having a protuberant base as shown in FIG. 1 is used as tie-down component for the front portion or legs of a seating unit 28.

The mounting device 20 is provided with a bore 31 which slidably carries a substantially vertically positioned shaft 32 and plunger 34. An eccentric means 36 is mounted on the body of the device 20 for positioning the plunger 34. The body of the mounting device 20 is further provided with anchoring means 40 for operably connecting the "to be tied down" associated payload.

Figure 2:
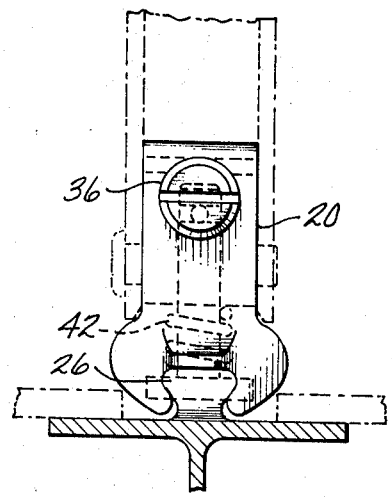
FIG. 2 is a vertical side view taken along line 2-2 of FIG. 1.

FIG. 2 illustrates the sturdy and firm fastening or securing of the mounting device 20 to the track 22 and in particular discloses the efficient locking feature. A spring 42 is located about the shaft 32 and exerts a force which tends to move the plunger 34 into the cutout 24. As shown the body of the mounting device 20 comprises a base structure which has a somewhat caliper or jaw-shaped configuration.

Figure 3:
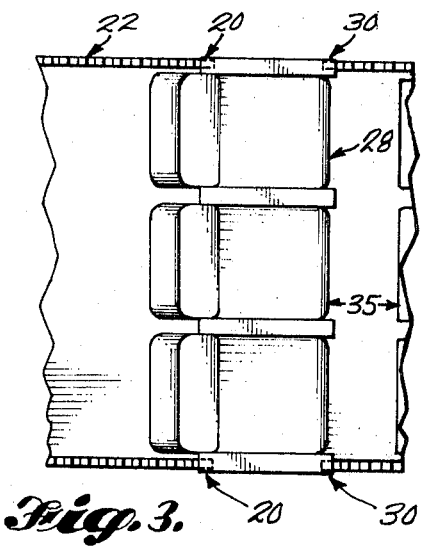
FIG. 3 is a plan view of a three-chair seating unit used in aircraft and wherein the present mounting device and a single fitting are used in pairs at each end of the unit.

The inside or concave surfaces of the caliper or jaw-shaped base structure is engaged to the seat track 22, and complements the convex surfaces of the top rail portion 26. The payload 28, which might be either seating units or cargo, is secured by the anchoring device 40. When a seating unit 28, such as illustrated in FIG. 3 is secured to the tracks 22, two mounting devices 20 are used in the rear and two fittings 30 are used to tie the front legs or vice versa. Because the seat track 22 is provided with a plurality of cutout sections 24 and top rail portions 26, the seating units can be arranged so that the required pitch 35 can be obtained.

Figure 4:
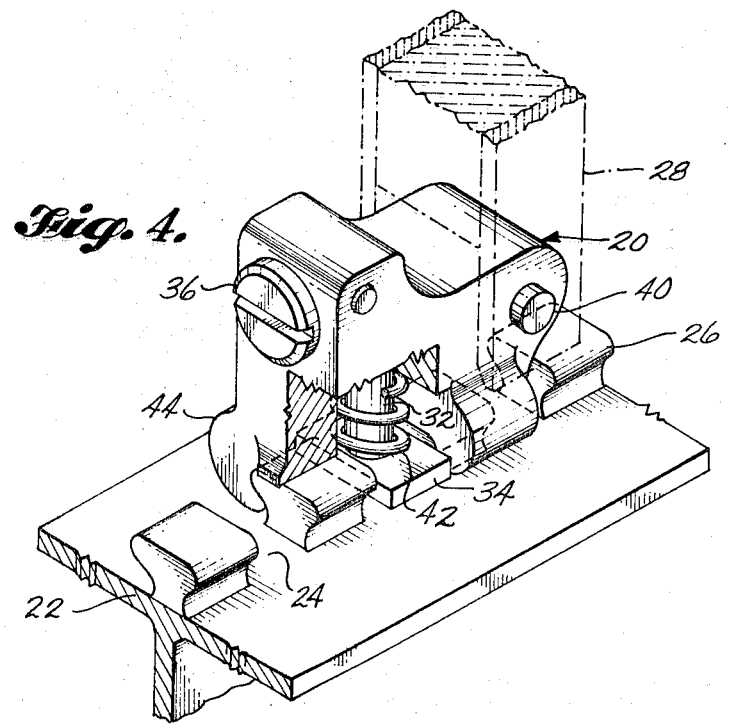
FIG. 4 is an isometric view of the mounting device in a secured position as shown in FIGS. 1 and 2 using the same track configuration.

As shown in the isometric illustration of FIG. 4, the mounting device 20 is installed by the simple step of inserting the double jaw-shaped legs 44 into cutout sections 24 and thereafter sliding the device 20 over on the top rail section 26 which will slidably engage with the inside curvature of the legs 44 of the jaw-shaped base in a complementing manner. This slidable type of engagement is thereafter secured by the actuation of the eccentric means 36 which upon rotation or activation will cause the shaft 32 and thereon connected plunger 34 to move downward into cutout 24. Movement of the plunger 34 by actuation of the eccentric means 36 is aided by the spring force of the spring 42.

When the mounting device 20 has to be detached, the plunger 34 is simply raised by rotating eccentric means 36 which upon rotation will move the plunger upward, against the spring force acting thereon. An approximate 180° rotation of the eccentric means 36 will lift the plunger 34 above the top rail section so that the mounting device 20 can be slid one width of a top rail section 26 and thereafter lifted and removed from the seat track or rail 22.

Figure 5:
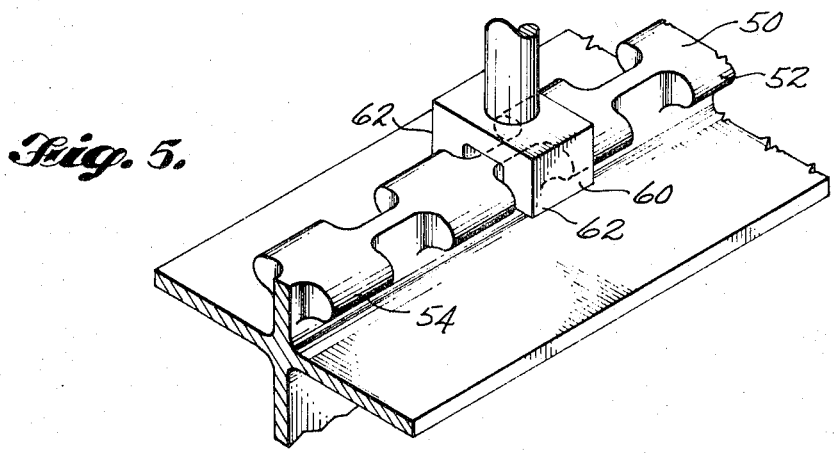
FIG. 5 is an isometric view of a different track and plug configuration, being the second preferred embodiment, using the same body (not shown) of the mounting device and operating mechanism as shown in FIGS. 1, 2 and 4.

The seat track configuration as shown in FIG. 5 has a slightly different configuration and has not been used in airplanes before. The present invention is designed to operate in coordination with the illustrated seat track. The simplicity of the mechanism and its foolproof operation increases the reliability above comparable devices now used in the aircraft industry and in addition, reduces the total weight of the payload tie down system.

The rail structure illustrated in FIG. 5 comprises a continuous vertically extending top part 52, rather than the interrupted head portions 26 as shown in rail 22, and this necessitates a slightly modified plug design. As shown in FIG. 5 the plug 60 has a pair of vertically extending side portions or flanges 62 which are located between the lip sections 54 of the rail 50. The locking or releasing mechanism connected to the plug 60 has been eliminated in the isometric illustration shown in FIG. 5, since its configuration and operation are similar to the embodiment shown in FIGS. 1, 2 and 4.

It is deemed unnecessary to illustrate the tie down of cargo by straps or other means, since it will be obviously understood that any type of strap, rope or chain can be anchored to the anchoring means 40 of the mounting device 20.

Accordingly, it should be understood that, while only two embodiments of the invention have been shown in the accompanying drawings, it will be obvious that various minor changes and modifications are possible without departing from the scope of the invention.

We claim:

1. An aircraft floor mounting device for releasably anchoring payload units to a rail member which is provided with a substantial round head portion and spaced intervening slots, comprising:
   a. a body having two pair of integrally connected legs, each said pair of legs having opposed concave inner surfaces for attachingly complementing said round head portion of said rail member when engaged thereon;
   b. said body provided with a substantially vertically extending bore at a location between said two pair of legs;
   c. a plug member connected to a shaft;
   d. said plug member disposed between said two pair of legs with said shaft slidably engaged within said bore;
   e. a spring positioned next to said plug member for biasing said plug member into said slot; and
   f. a horizontally positioned member with eccentric means provided on said body, said eccentric means linked to said shaft so that partly rotational actuation of said member causes a movement to said shaft in a vertical direction whereby said plug, biased by said spring, plugs said intervening slot for locking said mounting device onto said rail and whereby upon continued rotation of said member said shaft moves in a vertical direction against said biased spring so that said plug moves out of said slot, thereby unlocking said mounting device from said rail.

2. An aircraft floor mounting device for releasably anchoring payload units to a rail member which is provided with a substantial round head portion and spaced intervening slots as claimed in claim 11; wherein said eccentric means linked to said shaft comprises an offcenter pin and slot arrangement between said member and said shaft so that a full rotation of said member causes a reciprocating movement of said shaft and thereon connected plug.